(12) United States Patent
Au et al.

(10) Patent No.: US 8,914,354 B2
(45) Date of Patent: Dec. 16, 2014

(54) CARDINALITY AND SELECTIVITY ESTIMATION USING A SINGLE TABLE JOIN INDEX

(75) Inventors: Grace Au, Rancho Palos Verdes, CA (US); Rama Krishna Korlapati, El Segundo, CA (US); Haiyan Chen, Yorktown Heights, NY (US)

(73) Assignee: Teradata US, Inc., Dayton, OH (US)

( * ) Notice: Subject to any disclaimer, the term of this patent is extended or adjusted under 35 U.S.C. 154(b) by 858 days.

(21) Appl. No.: 12/510,292

(22) Filed: Jul. 28, 2009

(65) Prior Publication Data

US 2011/0029507 A1   Feb. 3, 2011

(51) Int. Cl.
G06F 17/30   (2006.01)

(52) U.S. Cl.
CPC .... *G06F 17/30498* (2013.01); *G06F 17/30489* (2013.01)
USPC ..... 707/715; 707/714; 707/741; 707/E17.054

(58) Field of Classification Search
None
See application file for complete search history.

(56) References Cited

U.S. PATENT DOCUMENTS

| | | | | |
|---|---|---|---|---|
| 5,826,076 A * | 10/1998 | Bradley et al. | ............ | 1/1 |
| 6,505,189 B1 * | 1/2003 | On Au et al. | ............ | 1/1 |
| 6,615,206 B1 * | 9/2003 | Jakobsson et al. | ............ | 1/1 |
| 7,155,428 B1 * | 12/2006 | Brown et al. | ............ | 1/1 |
| 2003/0135485 A1 * | 7/2003 | Leslie | ............ | 707/3 |
| 2006/0036576 A1 * | 2/2006 | Simmen | ............ | 707/2 |

* cited by examiner

*Primary Examiner* — Anteneh Girma
(74) *Attorney, Agent, or Firm* — Randy L. Campbell, Jr.

(57) ABSTRACT

A method for estimating the selectivity of a database base table predicate, the cardinality of a join, and the cardinality of an aggregation. The method includes receiving a database query, the query comprising one or more query predicates and referencing one or more database tables. One or more join indexes are identified, the join index(es) defined on respective database tables referenced by the database query. The join index(es) comprises one or more join index predicates, and includes one or more join columns in its select list. The row count selected by the query predicates is calculated at least partly using the row count or statistics of the one or more join indexes. The selectivity of the base table predicate is calculated at least partly from the calculated row count. The cardinality of the join is estimated at least partly from the row count and statistics of the identified join index(es).

17 Claims, 2 Drawing Sheets

CARDINALITY AND SELECTIVITY ESTIMATION USING A SINGLE TABLE JOIN INDEX

FIELD OF INVENTION

The invention relates to techniques for estimating the selectivity of a base table predicate, estimating the cardinality of a join, and estimating the cardinality of an aggregation.

BACKGROUND OF INVENTION

In a traditional database system there are many ways in which a database query can be executed. Where the query comprises several query predicates and references several database tables, there are several options as to the order in which these query predicates can be evaluated.

An optimizer determines the most cost effective ordering of execution of these query predicates within a database query. In a traditional optimizer, cardinality estimation for single table predicates and joins only uses demographic information. This demographic information, typically in the form of statistics, is defined on a single database table. In some cases demographic information is not available on a particular table. This lack of demographic information can affect the capability of an optimizer in estimating single-table cardinality and join cardinality. This in turn can lead to sub-optimal query plans.

A further difficulty is that some demographic information is captured in the form of a histogram. A histogram does not provide sufficient information for an optimizer to estimate the selectivity of complex predicates accurately. This inability to estimate selectivity accurately once again can lead to sub-optimal plans.

In some database systems some of the tables have associated single-table join indexes defined. It is typically less expensive to collect statistics on a join index than on a base table. It would be desirable to use information stored in a single-table join index to improve the accuracy of the cardinality estimation on its base table.

SUMMARY OF INVENTION

In one embodiment the invention provides a method of estimating selectivity of a base table predicate. The method includes receiving a database query, the query comprising one or more query predicates and referencing one or more database tables. One or more join indexes are identified, the join index(es) defined on respective database tables referenced by the database query, the join index(es) comprising one or more join index predicates. The row count selected by the query predicates is calculated at least partly using the row count or statistics of the one or more join indexes. The selectivity of the base table predicate is calculated at least partly from the calculated row count.

In a further embodiment the invention provides a method of estimating the cardinality of a join. The method includes receiving a database query, the query comprising one or more query predicates and referencing two or more database tables. One or more single-table join indexes are identified, the join index(es) defined on respective database tables referenced by the database query, the join index(es) having one or more join columns in its select list. The cardinality of the join is estimated at least partly from the row count and statistics of the identified join index(es).

In a further embodiment the invention provides a method of estimating cardinality of an aggregation. The method includes receiving a database query, the query comprising one or more query predicates and referencing one or more database tables, the database query including one or more GROUP-BY fields. One or more join indexes are identified, the join index(es) defined on respective database tables referenced by the database query. The row count of the rows selected by the query predicates is calculated at least partly using the row count or statistics on the one or more join indexes. The cardinality of the aggregation is calculated at least partly from the calculated row count.

DETAILED DESCRIPTION OF FIGURES

DETAILED DESCRIPTION

Figure 1:
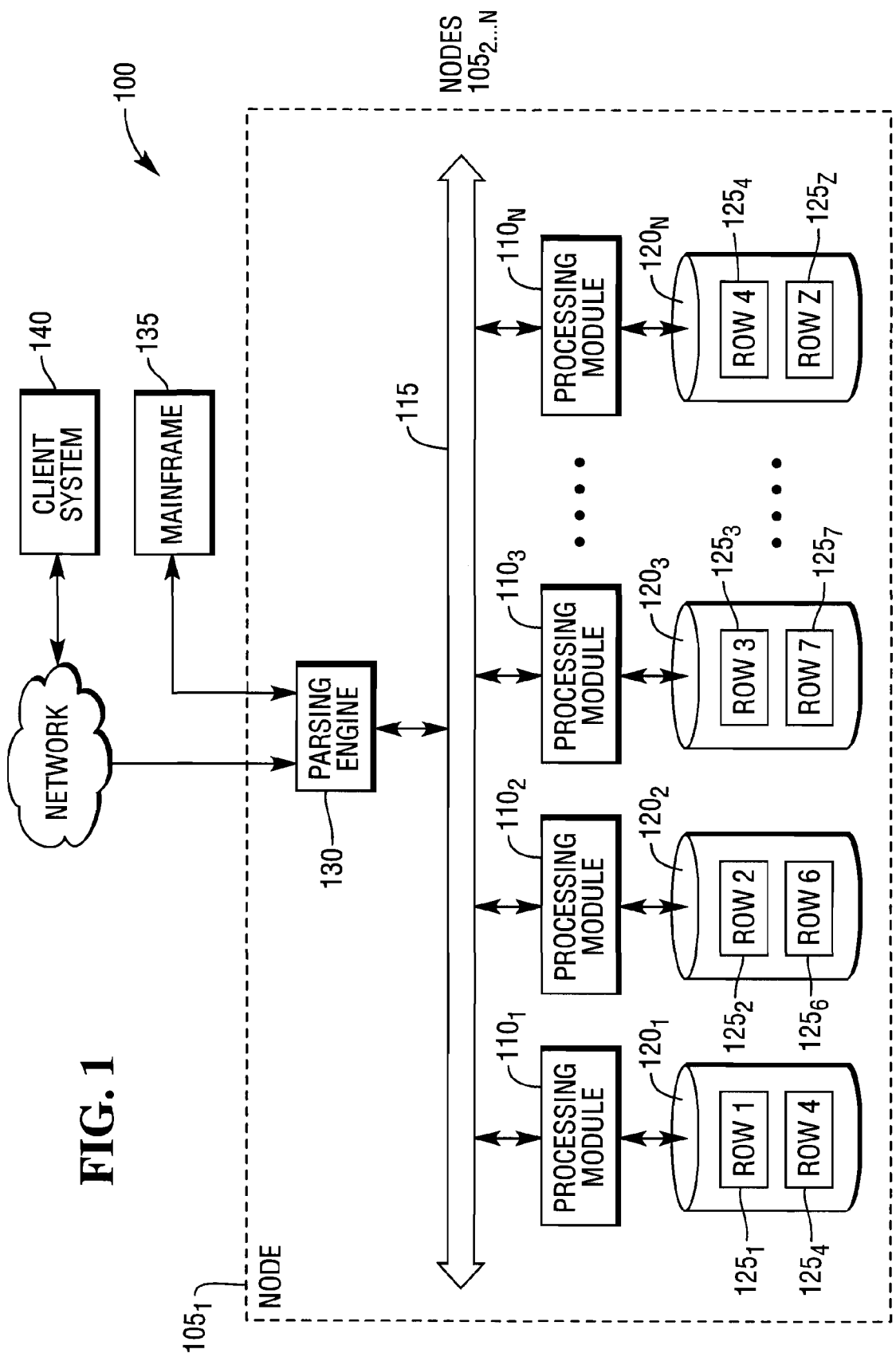
FIG. 1 shows a sample architecture for part of a database system within which the invention operates.

The techniques for cardinality and selectivity estimation described below have particular application but are not limited to large databases that might contain many millions or billions of records managed by a database system (DBS) 100, such as a Teradata Active Data Warehousing System. FIG. 1 shows a sample architecture for one node $105_1$ of the DBS 100. The DBS node $105_1$ includes one or more processing modules $110_{1 \ldots N}$ connected by a network 115. The processing modules manage the storage and retrieval of data stored in data storage facilities $120_{1 \ldots N}$. Each of the processing modules in one form comprises one or more physical processors. In another form they comprise one or more virtual processors, with one or more virtual processors running on one or more physical processors.

Each of the processing modules $110_{1 \ldots N}$ manages a portion of a database that is stored in corresponding data storage facilities $120_{1 \ldots N}$. Each of the data storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data storage facilities $120_{1 \ldots N}$. The rows $125_{1 \ldots Z}$ of the tables are stored across multiple data storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data storage facilities $120_{1 \ldots N}$ in response to queries received from a user at a mainframe 135 or a client computer 140. The DBS 100 usually receives queries and commands to build tables in a standard format, such as SQL.

The rows $125_{1 \ldots Z}$ are distributed across the data storage facilities $120_{1 \ldots N}$ by the parsing engine 130 in accordance with a primary index. The primary index defines the columns of the rows that are used for calculating a hash value. The function that produces the hash value from the values in the columns specified by the primary index is called the hash function. Some portion, possibly the entirety, of the hash value is designated as a hash bucket. The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

A join index in a system such as a Teradata Active Data Warehousing System is a materialized view with selected rows stored physically on data storage facilities, similar to a regular database table. The data integrity of the join index to its base tables is enforced by a join index maintenance system.

A join index can store join results as well as retrieve from a single table. When a join index retrieves all rows from a single database table, regardless whether all columns or only a portion of the columns are projected, it is called a non-sparse join index. When a join index retrieves only some portion of the rows from its base table, namely with row qualifying predicate(s) in its definition, it is called a sparse join index.

Figure 2:
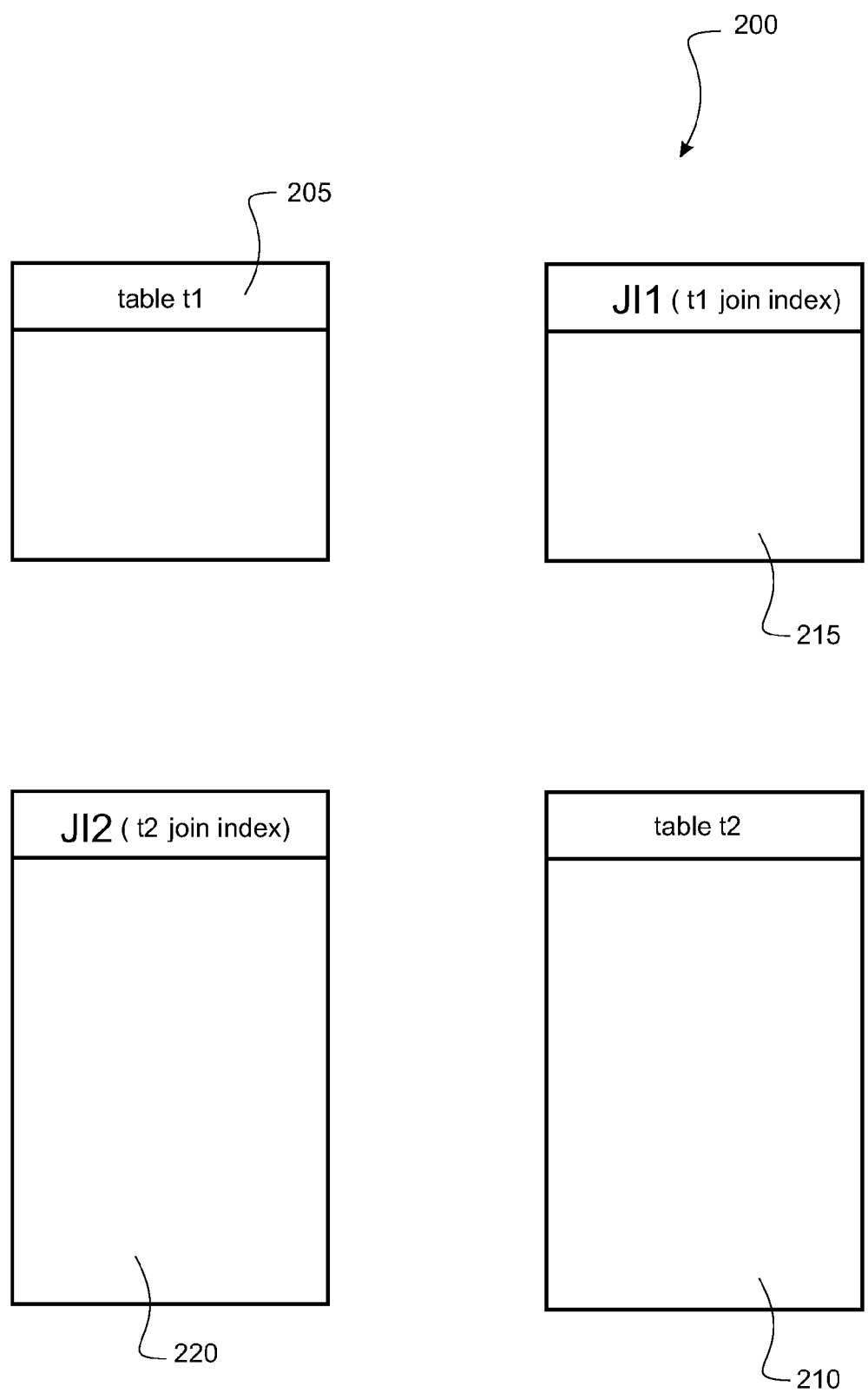
FIG. 2 shows a simplified database schema for the purposes of describing the invention.

FIG. 2 shows at 200 a simplified database schema for the purposes of describing the invention. Database schema 200 includes two database tables. These tables are table t1 indicated at 205 and table t2 indicated at 210. Database schema 200 includes join index JI1 indicated at 215. Join index 215 is a non-sparse single-table join index defined on table t1. Similarly JI2 is shown at 220 as a single-table sparse join index defined on table t2.

A join index has been used as a substitute for applicable base table(s) in the query in the case that that reduces the time and/or resources for executing the query. A join index can cover a query when its rows are a superset of the rows selected by the query.

Because a non-sparse join index has the same set of rows as the base table, the demographic information on the non-sparse single table join index and its base table are used interchangeably. However, the demographic information of a sparse join index is used only for the selectivity and cardinality estimation on the join index itself.

One aspect of the invention uses the demographic information of sparse join index, including the row count and statistics, for estimating the selectivity of applicable base table predicates, the cardinality of joins and the cardinality of aggregations that involve the join index's base table.

The row count of the selected join index can be calculated from the histogram of the primary index of the join index. Alternatively the row count can be determined from random sampling if no histogram exists on the primary index.

The technique includes a discovering phase in which the join index coverage is tested only against the predicates of a database query. In one preferred form the SELECT list and the GROUP-BY clause or clauses of the query are ignored. One intention of the discovering phase is to identify those single-table join indexes in which the predicates qualify the same set of rows or a superset of the rows qualified by the query predicates on the same columns. A join index predicate is determined as a matched predicate of the corresponding query predicate if both predicates qualify the same set of rows.

There are three different categories where a join index is suitable for cardinality estimation.

The first of these categories is a "matched predicate only" category. In this category the join index predicates are the same as the query predicates on the table. In this case both the join index and the query have the same set of matched predicates. Estimation based on the demographic information of the join index is very accurate.

In a special case a join index has the same set of predicates as the query predicates on the table. In these cases estimation based on the demographic information of a join index is very accurate.

In a second category, called "subset predicate", the join index predicates are a subset of the query predicates on the table. In this category the database query has more predicates than the matched predicates. The query returns fewer rows than the join index.

The third category involves "partial covering predicates". In this category the rows selected by the join index predicates is a superset of the rows selected by the query predicates. At least one join index predicate is not a matched predicate.

For the last two categories, the join index has the potential to qualify many more rows than the query predicates on its base table does. Even so, the estimation based on the join index histogram can still be better than using the base table histogram. The base table histogram represents the entire domain whereas the join index histogram represents a domain after applying at least some single table conditions. The accuracy difference of join indexes of different category is handled by marking the estimation with different confidence levels.

When a database query is received, the discovering phase is performed. This phase involves a search for join indexes in which the statistics and/or row count are usable for cardinality estimation based on condition coverage. The search is preferably performed once per flattened query block at the pre-join planning stage. The list of candidate join indexes found is used for the join planning of the original query for the purpose of selectivity and cardinality estimation. Likewise, the list is also used for each rewrite of the query using join indexes.

In one example, a query references four tables t1, t2, t3 and t4. The schema here also includes two single table join indexes. These join indexes are j1 and j3. They are defined on table t1 and table t3 respectively. The join planner can use these join indexes in the following three ways:

1. The original query (t1, t2, t3, t4) can use both j1 and j3 statistics.
2. The rewritten query (t1, t2, t3, t4) can use j3 statistics.
3. The rewritten query (t1, t2, j3, t4) can use j1 statistics.

Single-Table Cardinality Estimation

There are several cases that support using non-aggregate single-table sparse join indexes for single-table selectivity estimation.

In a first example the join index predicates are a subset or the same as that of the query predicates. In a second example the join index contains all rows to answer the query, but the join index conditions do not match with the query conditions.

The first example of a subset predicate is the following database query:

Q1: Select * from t1 where A=10 and B between 20 and 30;

The join index JI1 of table t1 is defined as:

JI1: Select A from t1 where B between 20 and 30;

Database query Q1 contains a first predicate "A=10" and a second predicate "B between 20 and 30". The query Q1 references database table t1.

Join index JI1 is defined on database table t1 which is the database table referenced by the database query Q1. Join index JI1 includes the join index predicate "B between 20 and 30". It will be appreciated that the join index could include more than one join index predicate.

In one preferred embodiment the row count of JI1 alone can be used as the number of rows selected by the predicate "B between 20 and 30".

Another technique for calculating the selectivity of the predicate "B between 20 and 30" is by dividing the number of rows in the join index JI1 by the base table row count. Table t1 is the base table.

If a histogram is not available on JI1, then the qualified number of values and the high mode frequency of this column can be derived from other sources such as base table statistics. These are statistics on base table t1.

In the example above the join index predicate or the set of predicates represents a subset of the query predicates. Both the join index and the query include the predicate "B between 20 and 30". The query includes the additional predicate of "A=10".

In a further preferred form a histogram on projected columns on the join index is used to estimate the selectivity of residual conditions. Residual conditions are the query conditions that have no matching join index condition. For instance, the residual condition in Q1 described above is the condition or predicate "A=10".

The combined selectivity of matching conditions and residual conditions that use join index statistics is the division of the number of selected rows by applying residual terms over the base table row count.

In the example above of JI1, the histogram JI1.A is used to calculate the number of join index rows that qualify the condition "A=10". In this case that is actually the number of rows that qualify the combined condition "A=10 and B between 20 and 30" on the base table. Therefore the combined selectivity of matching condition "A=10" and the residual condition "A=10 and B between 20 and 30" is simply:

(Row count of $j1.A$=10)/(base table row count).

In the second example the join index contains all the rows to answer the query but the join index conditions do not match with the query conditions. In this case, this join index is usable for cardinality estimation purposes only if the join index has histograms for all the columns that are referenced in the non matching conditions.

Consider the following query:
Q2: Select * from t1 where A=10 and B between 20 and 30 and C=11;
Assume that the join index for table t1 is defined as follows:
JI2: select A from t1 where A>5 and B between 20 and 30.
In this case the join index predicates do not match the query predicates exactly.

JI2 is used in selectivity estimation only when there is a histogram on JI2.A. The combined selectivity of "A=10 and B between 20 and 30" is calculated using JI2. The combined selectivity of "A=10 and B between 20 and 30" is calculated as follows:

(Row count of $JI2.A$=10)/(base table row count).

The selectivity calculated using the row count and/or histogram of one join index is combined with selectivity calculated from other sources such as base table histograms or other join indexes.

In the above example, JI2 cannot be used to calculate the selectivity of "A=10 and B between 20 and 30". However the row count of JI2 is used as the upper bound of the rows selected by the predicates "A=10 and B between 20 and 30", or by the whole WHERE clause of Q2. This upper bound is only used when no other source of demographic information is available for estimating the selectivity of "A=10 and B between 20 and 30".

In the above example the join index predicates qualify a set of rows from the base table.

The rows qualified by the join index predicates represent a superset of the rows qualified by the query predicates on the base table. The condition "A>5" in JI2 would qualify more rows than the predicate "A=10" in Q2.

Estimating Join Cardinality

A further embodiment of this invention provides a method of estimating cardinality of a join. In this technique the number of unique values and the high mode frequency of join columns are used to do join cardinality estimation. As above, the technique involves a database query. The query includes one or more query predicates and references one or more database tables. A sample query is as follows:

Q3: Select * from t1, t2 where X1=X2 and Y1=10;
The query predicates in Q3 are "X1=X2" and "Y1=10"
The database tables referenced are t1 and t2.

The technique involves identifying one or more single-table join indexes. The join indexes are defined on respective database tables referenced by the database query. In this case the single-table join indexes are defined on tables t1 and t2 respectively. These join indexes have one or more join columns in their projection list.

The cardinality of the join is estimated at least partly using the statistics of the identified join indexes.

In one technique, estimating the cardinality of the join includes calculating the number of unique values in the join column X1 after "Y1=10" is applied. This number of unique values is crucial data to more accurately estimate the join cardinality. This data is calculated at least partly from the statistics of a join index whose predicates are the same or a subset of the query predicates on its base table.

This number of unique values of X1 after applying the condition "Y1=10" is called the correlated values of X1 given Y1=10. A base table histogram on join column X1 can only obtain the estimation before the condition "Y1=10" is applied. It is beneficial to calculate the estimation on the join column X1 following the application of the query predicate "Y1=10". For the join index with the condition "Y1=10", its histogram on join column X1 is collected on the rows with condition "Y1=10" applied to base table rows.

Even the multi-dimensional histogram on (x1, y1) would not automatically give accurate correlation information because of the limitations on the multi-column statistics such as column ordering, length limit on concatenated column values and so on.

In a further preferred form the high mode frequency in the join columns is also calculated. In this case, single-table join indexes with the same or a subset of the predicates of the query are used to estimate both the number of unique values and the high mode frequency after applying the single-table conditions.

Join index JI3 is defined as follows:
JI3: Select X1 from t1 where Y1=10;
Statistics collected on column X1 of JI3 are used to estimate the number of unique values and high mode frequency on X1 after the predicate "Y1=10" is applied.

Aggregation Cardinality Estimation

Another embodiment of the invention provides a method of estimating cardinality of an aggregation. Here the number of unique values of the grouping fields is essential for estimating the number of rows returned by the aggregation query. An example aggregation database query is as follows:

Q4: Select X, Y sum (z) from t1
where A=10 and C>20
group by X, Y;

Database query Q4 includes one or more query predicates. The two query predicates here are "A=10" and "C is >20". Query Q4 references database table t1. It will be appreciated that the query could reference more than one database table. The database query also includes at least one "group-by" field. In this case the group-by fields include X and Y.

The technique identifies one or more join indexes. Here the join indexes are defined on respective database tables referenced by the database query.

The cardinality of the aggregation is calculated at least partly from the row count or the statistics of join index that has the same set or a subset of the predicates of the query.

In one embodiment an aggregate join index is used. This aggregate join index is used in cardinality estimation for aggregate queries if the aggregate join is selected has the same "group-by" field as the query. This of course implies that the identified aggregate join index includes at least one group-by field.

One example of a selected aggregate join index is JI4 as follows:

JI4: Select X, Y, count (z) from t1
where A=10 and C>20
group by X, Y;

The row count of JI4 is the cardinality of query Q4.

In another embodiment the identified join index includes a non-aggregate join index. A non-aggregate join index is used if it has associated multi-column statistics that have been collected on the group-by fields of the query. In one example the number of unique values of (X1, Y1) is found in a histogram JI5 as follows:

JI5: Select X1, Y1 from t1 where A=10 and C>20.

Non-aggregate join index JI5 has a histogram that is defined on (ji5.x1, ji5.y1), whose number of unique values is the cardinality of Q4 above.

The techniques described above have the potential to provide several advantages. In particular the advantages of using join index demographic information for selectivity estimation on a base table include:

Improving the confidence and accuracy of single-table cardinality estimations by using more reliable demographic information such as those on an applicable join index.

Improving the consistency of plan comparison because both the plan with the join index and the plan without the join index can use the statistics from the same join index for selectivity estimation.

Providing a way to derive the demographics of the join columns after applying the single-table predicates.

Relieving the customers of the burden of collecting statistics on the base tables if the queries in the workload are covered by the single-table join indexes. The estimation based on timely refreshed demographic information of join indexes can be better than estimations based on stale histograms of the base table.

Providing a solution to the limitations of multi-column histograms on base tables, such as truncated histogram datum and insensitive column ordering.

Improving the accuracy of join cardinality estimation by using demographic information on join indexes.

Improving the accuracy of the cardinality estimation of aggregate queries by using demographic information on join indexes.

The text above describes one or more specific embodiments of a broader invention. The invention also is carried out in a variety of alternative embodiments and thus is not limited to those described here. Those other embodiments are also within the scope of the following claims.

We claim:

1. A method of estimating selectivity of a base table predicate, the method comprising:
   receiving, with a processor, a database query, the query comprising one or more query predicates and referencing one or more database tables;
   identifying, with the processor, one or more join indexes, wherein each of the one or more join index(es) is respectively defined on a single one of database tables referenced by the database query, the join index(es) comprising one or more join index predicates;
   calculating, with the processor, a row count of rows of the database tables referenced by the database query selected by the query predicates at least partly using a row count of the one or more join indexes or statistics of the one or more join indexes; and
   calculating, with the processor, selectivity of at least one of the query predicates at least partly from the calculated row count.

2. The method of claim 1 wherein the selectivity of the at least one of the query predicates is calculated from a function of the calculated row count and a base table row count of a database table associated with the at least one of the query predicates.

3. The method of claim 2 wherein the selectivity of the at least one of the query predicates is the calculated row count divided by the base table row count.

4. The method of claim 2 wherein the join index predicate (s) represent a subset of the query predicate(s).

5. The method of claim 2 wherein the join index predicate (s) represent the same set as the query predicate(s).

6. The method of claim 2 wherein the join index predicate (s) qualify a set of rows from the database table associated with the at least one of the query predicates, the qualified rows representing a superset of a set of rows qualified by the query predicate(s) on the base table.

7. The method of claim 1 further comprising calculating, with the processor, the row count of the join index(es) from an associated histogram of a primary index of the join index(es).

8. The method of claim 1 further comprising calculating, with the processor, the row count of the join index(es) from random sampling.

9. A method of estimating cardinality of an aggregation, the method comprising:
   receiving, with a processor, a database query, the query comprising one or more query predicates and referencing one or more database tables, the database query including one or more GROUP-BY fields;
   identifying, with the processor, one or more join indexes, wherein each of the one or more join index(es) is respectively defined on a single one of database tables referenced by the database query;
   calculating, with the processor, a row count of rows selected by the query predicates at least partly using a row count of the one or more join indexes or statistics on the one or more join indexes; and
   calculating, with the processor, the cardinality of the aggregation at least partly from the calculated row count.

10. The method of claim 9 wherein one of the identified join indexes comprises an aggregate join index.

11. The method of claim 10 wherein the identified aggregate join index includes one or more GROUP-BY fields, the GROUP-BY fields of the join index matching the GROUP-BY fields of the query.

12. The method of claim 9 further comprising calculating, with the processor, the row count of the join index(es) from an associated histogram of a primary index of the join index(es).

13. The method of claim 9 further comprising calculating, with the processor, the row count of the join index(es) from random sampling.

14. The method of claim 9 wherein one of the identified join indexes comprises a non-aggregate join index.

15. The method of claim 14 wherein the identified non-aggregate join index has associated multi-column statistics collected on the GROUP-BY fields of the query.

16. A non-transitory computer-readable medium having stored thereon computer-executable instructions that when executed on a computing device cause the computing device to perform a method of estimating selectivity of a base table predicate, the method comprising:

receiving a database query, the query comprising one or more query predicates and referencing one or more database tables;

identifying one or more join indexes, wherein each of the one or more join index(es) is respectively defined on a single one of database tables referenced by the database query, the join index(es) comprising one or more join index predicates;

calculating a row count of rows selected by the query predicates at least partly using a row count of the one or more join indexes or statistics of the one or more join indexes; and calculating the selectivity of the base table predicate at least partly from the calculated row count.

17. A non-transitory computer-readable medium having stored thereon computer-executable instructions that when executed on a computing device cause the computing device to perform a method of estimating cardinality of an aggregation, the method comprising:

receiving a database query, the query comprising one or more query predicates and referencing one or more database tables, the database query including one or more GROUP-BY fields;

identifying one or more join indexes, wherein each of the one or more join index(es) is respectively defined on a single one of database tables referenced by the database query;

calculating a row count of rows selected by the query predicates at least partly using a row count of the one or more join indexes or statistics on the one or more join indexes; and calculating the cardinality of the aggregation at least partly from the calculated row count.

* * * * *